(12) United States Patent
Katayama et al.

(10) Patent No.: US 9,051,422 B2
(45) Date of Patent: Jun. 9, 2015

(54) THERMALLY POLYMERIZABLE RESIN COMPOSITION

(75) Inventors: Atsuhiko Katayama, Fukuoka (JP); Keiji Banno, Fukuoka (JP); Niranjan Kumar Shrestha, Fukuoka (JP); Toshihide Senzaki, Tokyo (JP)

(73) Assignee: NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 301 days.

(21) Appl. No.: 12/310,522

(22) PCT Filed: Sep. 13, 2007

(86) PCT No.: PCT/JP2007/067804
§ 371 (c)(1),
(2), (4) Date: Feb. 27, 2009

(87) PCT Pub. No.: WO2008/035605
PCT Pub. Date: Mar. 27, 2008

(65) Prior Publication Data
US 2010/0273941 A1  Oct. 28, 2010

(30) Foreign Application Priority Data
Sep. 19, 2006 (JP) .................................. 2006-252527

(51) Int. Cl.
| | |
|---|---|
| C08F 2/16 | (2006.01) |
| C08G 65/18 | (2006.01) |
| C08G 65/22 | (2006.01) |
| C08G 65/26 | (2006.01) |
| C08L 71/02 | (2006.01) |

(52) U.S. Cl.
CPC ............... *C08G 65/18* (2013.01); *C08G 65/22* (2013.01); *C08G 65/2666* (2013.01); *C08L 71/02* (2013.01)

(58) Field of Classification Search
USPC ....................................................... 524/800
See application file for complete search history.

(56) References Cited

U.S. PATENT DOCUMENTS

| 4,833,183 A | 5/1989 | Vandenberg | |
|---|---|---|---|
| 5,648,557 A * | 7/1997 | Wei | ............................... 568/617 |
| 6,232,361 B1 * | 5/2001 | Laksin et al. | ................... 522/84 |
| 6,570,041 B1 * | 5/2003 | Kodama et al. | ............... 568/617 |
| 2004/0059086 A1 * | 3/2004 | Pettersson et al. | ............ 528/417 |

FOREIGN PATENT DOCUMENTS

| JP | 58-057429 | | 4/1983 |
|---|---|---|---|
| JP | 58150519 | A | 9/1983 |
| JP | 59-159824 | | 9/1984 |
| JP | 03-258874 | | 11/1991 |
| JP | 3074086 | | 1/1994 |
| JP | 9067434 | A | 3/1997 |
| JP | 09-208674 | | 8/1997 |
| JP | 09-221625 | | 8/1997 |
| JP | 09-291144 | | 11/1997 |
| JP | 2002-155136 | | 5/2002 |
| JP | 2002161134 | A * | 6/2002 |
| JP | 2002-348359 | | 12/2002 |
| WO | WO-2007/032185 | | 3/2007 |

OTHER PUBLICATIONS

Hiroshi Sasaki Journal of the Adhesion Society of Japan, 38(12), 452 (2002).*
Machine translation of JP 2002-161134.*
S. Akiyoshi et al., "The Preparation and the amination of poly[3,3-bis(chloromethy)oxacyclobutane]," Univ, Kyushu, Kogyo Kagaku Zasshi, 1960, 63, pp. 541-543 and the English abstract thereof.
The Chemistry of Cationic Polymerization, Symposium Publications Division, Pergamon Press, 1963; pp. 424-427.
International Preliminary Report on Patentability on PCT/JP2007/067804 (6 pages).
International Search Report dated Oct. 16, 2007, issued on PCT/JP2007/067804.
Extended European Search Report issued in European Patent Application No. EP 07807211.3, dated Jul. 2, 2012.
XP002678279, Abstract only: Chen et al. "Tetrahydrofuran polymerisation initiated by heteropolyacid VII."

* cited by examiner

*Primary Examiner* — Wenwen Cai
(74) *Attorney, Agent, or Firm* — Locke Lord LLP; James E. Armstrong, IV; Nicholas J. DiCeglie, Jr.

(57) ABSTRACT

A water-soluble thermally polymerizable oxetane resin composition comprises (A) a water-soluble oxetane compound and (B) at least one heteropolyacid compound selected from heteropolyacids and heteropolyacid salts. The water-soluble oxetane compound may contain one or more oxetane functional groups in the molecule and one or more alcoholic OH groups in the molecule. The heteropolyacids include phosphotungstic acid, phosphomolybdic acid, silicotungstic acid, silicomolybdic acid or mixtures thereof. The heteropolyacid salts include phosphotungstic acid salts, phosphomolybdic acid salts, silicotungstic acid salts, silicomolybdic acid salts or mixtures thereof.

2 Claims, No Drawings

THERMALLY POLYMERIZABLE RESIN COMPOSITION

TECHNICAL FIELD

This invention relates to a water-soluble, thermally polymerizable oxetane resin composition.

BACKGROUND TECHNOLOGY

Oxetane compounds give negative results in the Ames test even when their molecular weight is low and are highly stable and thermally polymerizable as described in the non-patent document 1 and they are suitable for use in areas such as coating materials, paints, adhesives, pressure-sensitive adhesives, and the like. In recent years, consideration of environmental hazards and product safety favors the use of oxetane compounds in aqueous solutions free of organic solvents in the aforementioned areas. However, no catalyst has been known that can polymerize oxetane compounds in the form of an aqueous solution. For example, a variety of oxetane derivatives and photopolymerizable compositions are described in the patent document 1; however, these compositions are neither water-soluble nor suited for thermal polymerization.

Patent document 1: JP3074086 B

Patent document 2: JPH9-208674 A

Patent document 3: JPH9-221625 A

Non-patent document 1: Journal of the Adhesion Society of Japan, 38 (12), 452 (2002)

Non-patent document 2: Kogyo Kagaku Zasshi, 63 (3), 541 (1960)

Non-patent document 3: The Chemistry of Cationic Polymerization, Symposium Publications Division, Pergamon Press, 1963; p 424

It is described in Kogyo Zairyo, 49 (6), 53 (2001) that quaternary onium salts such as tetraphenylphosphonium bromide are effective for the thermal polymerization of oxetane compounds. However, these quaternary onium salts are not soluble in water and cannot be used as an aqueous solution.

Resin compositions containing sulfonium salts as a catalyst are described as excellently capable of polymerizing at low temperature in the patent document 3. These sulfonium salts are commercially available in the tradename of San-aid SI series from Sanshin Chemical Industry Co., Ltd. However, as described in the product safety data sheets issued by the company, they decompose in contact with water and cannot be used as an aqueous solution.

Polymerizable oxetane compositions containing organosilanes and aluminum chelates as catalysts are described in the patent document 2. However, these catalysts are not soluble in water and react with water to form insoluble silica-alumina.

An example of the polymerization of an oxetane by a $BF_3$-ether complex is described in the non-patent document 2; the Friedel-Crafts type cationic polymerization catalysts such as a $BF_3$-ether complex and tin chloride are generally used for cationic polymerization, but they cannot be used in an aqueous medium as they are inhibited by water from participating in polymerization as described in the non-patent document 3. Thus, it has been difficult to polymerize oxetanes cationically in an aqueous solution in the presence of any of the conventional catalysts.

DISCLOSURE OF THE INVENTION

Problems to be Solved by the Invention

This invention provides a water-soluble, thermally polymerizable oxetane resin composition curable in the state of aqueous solution.

Means to Solve the Problems

The inventors have noted that heteropolyacids show high acid strength and do not lose their activity in the co-presence of water, repeated investigations, found that a thermally polymerizable resin composition essentially comprising (A) a water-soluble oxetane compound and (B) a heteropolyacid compound can be used as a thermally polymerizable composition in the form of aqueous solution, and completed this invention.

Accordingly, this invention relates to a thermally polymerizable resin composition essentially comprising (A) a water-soluble oxetane compound and (B) at least one heteropolyacid compound selected from heteropolyacids and heteropolyacid salts.

A preferable example of such water-soluble oxetane compounds is an oxetane compound containing one or more oxetane functional groups represented by the following general formula (1) in the molecule and one or more alcoholic OH groups in the molecule:

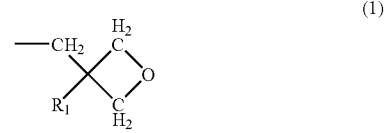

wherein, $R_1$ is a hydrogen atom, an alkyl group of 1 to 6 carbon atoms, a fluorine atom, a fluoroalkyl group of 1 to 6 carbon atoms, an allyl group, an aryl group, an aralkyl group, a furyl group, or a thienyl group.

Another preferable example of the water-soluble oxetane compounds is an oxetane compound represented by the following general formula (2):

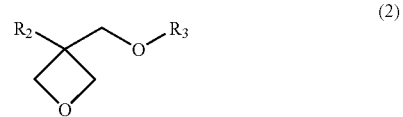

wherein, $R_2$ is a hydrogen atom or an alkyl group of 1 to 6 carbon atoms and $R_3$ is a hydrogen atom or a group represented by the following general formula (3) or (4);

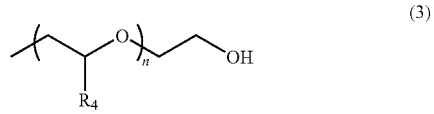

wherein, $R_4$ is a hydrogen atom, an alkyl group of 1 to 6 carbon atoms, or a hydroxyl group; in general formula (3) or (4), n is independently an integer of 2 to Other examples of the water-soluble oxetane compounds include oxetane compounds represented by the following general formulas (5) to (11):

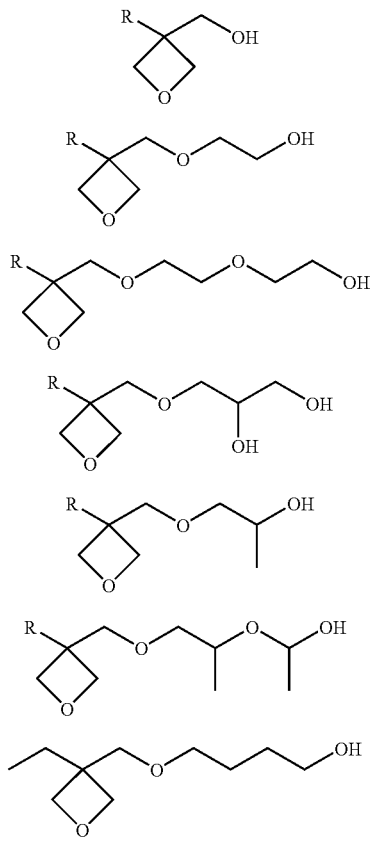

in these general formulas, R is independently a hydrogen atom or an alkyl group of 1 to 6 carbon atoms.

Preferable examples of the heteropolyacid compound selected from heteropolyacids and heteropolyacid salts include phosphotungstic acid, phosphomolybdic acid, silicotungstic acid, and silicomolybdic acid and mixtures thereof. Other preferable examples include phosphotungstic acid salts, phosphomolybdic acid salts, silicotungstic acid salts, and silicomolybdic acid salts and mixtures thereof.

Further, it is preferable that the heteropolyacid compounds are soluble in water or the thermally polymerizable resin compositions as a whole are soluble in water. This invention further relates to the aforementioned thermally polymerizable resin composition occurring as a solution in an aqueous medium.

An oxetane compound showing any solubility in water may be used as a water-soluble oxetane compound according to this invention. However, when applications to paints, coatings, adhesives, pressure-sensitive adhesives, and the like are intended, the water-soluble oxetane compound of interest preferably shows a solubility of 5 wt % or more, more preferably a solubility of 10 wt % or more.

Useful as such a water-soluble oxetane compound is an oxetane compound containing one or more oxetane functional groups represented by the aforementioned general formula (1) in the molecule and one or more alcoholic OH groups in the molecule. In general formula (1), $R_1$ is a hydrogen atom, an alkyl group of 1 to 6 carbon atoms, a fluorine atom, a fluoroalkyl group of 1 to 6 carbon atoms, an allyl group, an aryl group, an aralkyl group, a furyl group, or a thienyl group and, preferably, $R_1$ is a hydrogen atom or an alkyl group of 1 to 4 carbon atoms.

Other water-soluble oxetane compounds are the ones represented by the aforementioned general formula (2). In general formula (2), $R_2$ is a hydrogen atom or an alkyl group of 1 to 6 carbon atoms and $R_3$ is a hydrogen atom or a group represented by the aforementioned general formula (3) or (4). In general formula (3), $R_4$ is a hydrogen atom, an alkyl group of 1 to 6 carbon atoms, or a hydroxyl group. In general formulas (3) and (4), n is an integer of 2 to 4.

Preferable examples of the water-soluble oxetane compounds are those represented by the aforementioned general formulas (5) to (11). In general formulas (5) to (10), R is independently a hydrogen atom or an alkyl group of 1 to 6 carbon atoms and, preferably, R is a hydrogen atom or an alkyl group of 1 to 4 carbon atoms.

At least one heteropolyacid compound is selected from heteropolyacids and heteropolyacid salts. A heteropolyacid forms as follows: molybdenum(VI) ions and tungsten(VI) ions, for example, become oxo acids in water and the oxo acids polymerize to yield high-molecular-weight polyoxo acids. During this polymerization, not only oxo acids of the same kind polymerize by themselves but also oxo acids of one kind polymerize around oxo acids of another kind to form heteropolyacids. The element forming the oxo acids in the center is called a hetero element while the element forming the oxo acids that polymerize around the oxo acids in the center is called a poly element. The hetero elements include Si, P, As, S, Fe, and Co and the poly elements include Mo, W, and V. A variety of poly elements can access the hetero elements during polymerization and various combinations of poly and hetero elements can produce a large variety of heteropolyacids. Such heteropolyacids and salts thereof can be used without specific restriction in this invention. However, the heteropolyacid compounds are preferably soluble in water.

In consideration of the ability to effect polymerization and the ease of availability, phosphotungstic acid, phosphomolybdic acid, silicotungstic acid, and silicomolybdic acid are preferable and silicotungstic acid and silicomolybdic acid are more preferable.

The heteropolyacid salts include metal salts such as alkali metal salts, alkaline earth metal salts and organic salts such as ammonium salts, pyridinium salts, and quinolinium salts of the aforementioned heteropolyacids. The sodium salts, potassium salts, cesium salts, calcium salts, ammonium salts, and pyridinium salts are preferable as they are readily available.

The amount of the heteropolyacid compound to be incorporated in the composition is in the range of 0.01 to 10 parts by weight, preferably 0.02 to 5 parts by weight, per 100 parts by weight of the water-soluble oxetane compound. Incorporation of less than about 0.01 part by weight degrades polymerizability and processability while incorporation in excess of about 10 parts by weight lowers storage stability. The heteropolyacid compound has an ability to act as a polymerization catalyst.

The thermally polymerizable resin composition of this invention essentially comprises a water-soluble oxetane compound and a heteropolyacid compound. The thermally polymerizable resin composition can undergo polymerization in the state of aqueous solution and, to make the most of this special feature, the composition preferably contains an aqueous medium. More preferably, the thermally polymerizable resin composition is a composition consisting of a solution of a water-soluble oxetane compound and a heteropolyacid compound in an aqueous medium. The amount of the aqueous medium is such as to be sufficient to dissolve at least one, preferably both, of the water-soluble oxetane compound and the heteropolyacid compound. The aqueous medium is most simply water, but it may contain an organic solvent that is compatible with water such as an alcohol, if necessary.

The thermally polymerizable resin composition of this invention is heated in the usual manner to yield a polymer. This thermal polymerization is effected by dissolving the thermally polymerizable resin composition in an aqueous medium and allowing the resulting solution to polymerize. In the preparation of the aqueous solution, water is used alone or together with a water-soluble organic solvent; such water-soluble organic solvents include alcohols such as methanol, ethanol, and ethylene glycol, ethers such as diethyl ether and THF, and esters such as ethyl acetate. In some cases, a polar organic solvent such as the one mentioned above may be used in place of water. Further, an emulsion prepared from water, a water-insoluble organic solvent and a surfactant may be used; examples of such water-insoluble organic solvents are aromatic hydrocarbons such as toluene and xylene, aliphatic hydrocarbons such as hexane and methylcyclohexane, and chlorinated hydrocarbons such as 1,2-dichloroethane. On the other hand, the polymerization can also be carried out solventless in the molten state. When the thermal polymerization is carried out in the dissolved state, the temperature is preferably kept in the range of 50 to 300° C. When the thermal polymerization is carried out in the molten state, the temperature is preferably kept above the melting point of the compound having an oxetane ring and below 300° C. A preferred procedure involves dissolving a solid, thermally polymerizable resin composition in an aqueous medium containing preferably 30 wt % or more, more preferably 50 wt % or more, of water and subjecting the resulting solution to thermal polymerization. The thermally polymerizable resin composition of this invention may be solid or in the form of a solution.

When the thermally polymerizable resin composition is a solution in an aqueous medium, it is polymerized at 50° C. or above. It is advantageous to carry out the polymerization at 100° C. or above in order to raise the reaction rate; however, if the temperature were kept at 100° C. or above at atmospheric pressure, water would likely evaporate thereby preventing the polymerization from advancing uniformly. An advantageous procedure consists of advancing the polymerization until gelation occurs at 100° C. or below, then evaporating water, and advancing the polymerization still further for 1 to 5 hours while keeping the temperature at 100° C. or above. In this case, the reaction at 100° C. or below is carried out at 50 to 100° C. for 1 to 6 hours and the reaction at 100° C. or above is carried out at 110 to 160° C. for 1 to 6 hours. The polymer obtained in this manner is free of water. It is to be noted that the polymerization can be completed at 100 or below as well, but this normally requires a period of 10 hours or more.

The pressure during the thermal polymerization is not limited to a specified level and it may be below, at, or above atmospheric pressure. The period for the thermal polymerization varies with the kind of compound in the composition and the reaction conditions and it is in the range of 1 to 10 hours, preferably 0.5 to 3 hours. The thermal polymerization is preferably carried out in an atmosphere of inert gas such as nitrogen, argon, and helium.

Upon completion of the polymerization of the thermally polymerizable composition, the reaction product is cooled in the usual manner by air or water to normal temperature and the polymer produced is taken out of the reactor. If necessary, the polymer is further dried at 100° C. or below for 2 to 10 hours by a known technique such as hot-air drying, vacuum drying, and freeze drying. When the thermally polymerizable composition is initially prepared as a solution and then polymerized or when the thermally polymerizable composition is polymerized in a reaction solvent, the reaction product is cooled after evaporation of the solvent to give a solvent-free polymer or the reaction product is cooled as it is to give a soft polymer containing the solvent.

The thermally polymerizable composition of this invention may be applied to a substrate such as metal, rubber, plastics, molded parts, film, paper, wood, glass cloth, concrete, and ceramic and polymerized by heating at a prescribed temperature for a prescribed period of time: that is, a substrate covered with a film of the polymer can be obtained.

It is allowable to add a variety of known additives such as the following to the thermally polymerizable composition of this invention to the extent that the addition does not destroy the effects of this invention; inorganic fillers, reinforcing materials, colorants, stabilizers (such as heat stabilizers and weatherability improvers), fillers, viscosity controllers, flame retardants, ultraviolet absorbers, antioxidants, discoloration inhibitors, antibacterial agents, anti-fungal agents, anti-aging agents, antistatic agents, plasticizers, lubricants, foaming agents, and mold release agents.

PREFERRED EMBODIMENTS OF THE INVENTION

This invention will be described concretely below with reference to the examples. The term "part" is on a weight basis. The following materials were used as received without purification in the examples and the comparative example.

Component (A)

Oxetane compound (1): (3-Ethyl-oxetan-3-yl)-methanol, manufactured by Ube Industries, Ltd.

Oxetane compound (2): 3-(3-Ethyl-oxetan-3-ylmethoxy)-propan-1-ol, manufactured by Ube Industries, Ltd.

Oxetane compound (7): 4-(3-Ethyl-oxetan-3-ylmethoxy)-butan-1-ol, manufactured by Ube Industries, Ltd.

Oxetane compound (4): 3-(3-Ethyl-oxetan-3-ylmethoxy)-propan-1,2-diol, manufactured by Ube Industries, Ltd.

Oxetane compound (5): 1-(3-Ethyl-oxetan-3-ylmethoxy)-propan-2-ol

Oxetane compound (6): 1-[2-(3-Ethyl-oxetan-3-ylmethoxy)-1-methyl-ethoxy]-ethanol Oxetane compound (3): 2-[2-(3-Ethyl-oxetan-3-ylmethoxy)-ethoxy]-ethanol Oxetane mixture (8): a mixture of 19% Oxetane compound (1), 55% Oxetane compound (5), and 20% Oxetane compound (6) (% by GC area), manufactured by Aoki Oil Industrial Co., Ltd.

Oxetane mixture (9): a mixture of 38% Oxetane compound (1), 27% Oxetane compound (2), and 20% Oxetane compound (3) (% by GC area), manufactured by Aoki Oil Industrial Co., Ltd.

Component (B)

Silicotungstic acid, manufactured by Nippon Inorganic Colour & Chemical Co., Ltd.

Example 1

A homogeneous aqueous solution was prepared by mixing 5.0 g of Oxetane compound (1), 5.0 g of water, and 0.15 g of silicotungstic acid at room temperature. The aqueous solution was placed in an aluminum cup with a diameter of 50 mm and allowed to polymerize at 80° C. for 3 hours and then at 150°

C. for 3 hours at atmospheric pressure to give a gel which turned to a colorless transparent solid polymer as water evaporated. The polymer was dissolved in THF and its molecular weight was measured by GPC: $M_n=1000$ and $M_w=2800$ (calibrated against polystyrene). The softening point measured by DSC was 74° C. Analysis by gas chromatography of the THF solution detected no oxetane compound. The yield of the polymer was 100%.

Example 2

A homogeneous aqueous solution was prepared by mixing 5.0 g of Oxetane compound (2), 5.0 g of water, and 0.15 g of silicotungstic acid at room temperature. The aqueous solution was placed in an aluminum cup with a diameter of 50 mm and allowed to polymerize at 80° C. for 3 hours and then at 150° C. for 3 hours to give a colorless transparent viscous polymer. The polymer was dissolved in THF and its molecular weight was measured by GPC: $M_n=950$ and $M_w=2800$.

Example 3

A homogeneous aqueous solution was prepared by mixing 5.0 g of Oxetane compound (4), 5.0 g of water, and 0.15 g of silicotungstic acid at room temperature. The aqueous solution was placed in an aluminum cup with a diameter of 50 mm and allowed to polymerize at 80° C. for 3 hours and then at 150° C. for 3 hours to give a colorless transparent viscous polymer. The polymer was dissolved in THF and its molecular weight was measured by GPC: $M_n=650$ and $M_w=1400$.

Example 4

A homogeneous aqueous solution was prepared by mixing 5.0 g of Oxetane compound (7), 5.0 g of water, and 0.15 g of silicotungstic acid at room temperature. The aqueous solution was placed in an aluminum cup with a diameter of 50 mm and allowed to polymerize at 80° C. for 3 hours and then at 150° C. for 3 hours to give a colorless transparent viscous polymer. The polymer was dissolved in THF and its molecular weight was measured by GPC: $M_n=660$ and $M_w=2800$.

Example 5

A homogeneous aqueous solution was prepared by mixing 5.0 g of Oxetane mixture (8), 5.0 g of water, and 0.15 g of silicotungstic acid at room temperature. The aqueous solution was placed in an aluminum cup with a diameter of 50 mm and allowed to polymerize at 80° C. for 3 hours and then at 150° C. for 3 hours to give a colorless transparent viscous polymer. The polymer was dissolved in THF and its molecular weight was measured by GPC: $M_n=490$ and $M_w=6300$.

Example 6

A homogeneous aqueous solution was prepared by mixing 5.0 g of Oxetane mixture (9), 5.0 g of water, and 0.15 g of silicotungstic acid at room temperature. The aqueous solution was placed in an aluminum cup with a diameter of 50 mm and allowed to polymerize at 80° C. for 3 hours and then at 150° C. for 3 hours to give a colorless transparent viscous polymer. The polymer was dissolved in THF and its molecular weight was measured by GPC: $M_n=220$ and $M_w=2600$.

Comparative Example 1

A homogeneous aqueous solution was prepared by mixing 5.0 g of Oxetane compound (1), 5.0 g of water, and 0.15 g of BF$_3$-diethyl ether complex at room temperature. The aqueous solution was placed in an aluminum cup with a diameter of 50 mm and heated at 80° C. for 3 hours and then at 150° C. for 3 hours, but no polymer was obtained. Analysis of the reaction mixture by gas chromatography detected 74% of trimethylolpropane and 23% of the oxetane compounds (% by GC area).

INDUSTRIAL APPLICABILITY

This invention provides a water-soluble, thermally polymerizable resin composition. The thermally polymerizable composition can be used as an aqueous solution and is expected to find use in the areas such as paints, coatings, adhesives, pressure-sensitive adhesives, and the like.

The invention claimed is:
1. A thermally polymerizable resin composition comprising (A) a water-soluble oxetane compound having one or more hydroxyl groups as a main component, (B) a heteropolyacid compound as a polymerization catalyst, and (C) an aqueous medium containing 50 wt % or more of water, wherein the water-soluble oxetane compound is selected from the oxetane compounds represented by formulas (5), (7), (8), and (10), the heteropolyacid compound is at least one selected from heteropolyacids and heteropolyacid salts, the heteropolyacid compound is incorporated in an amount in the range of 0.01 to 10 parts by weight per 100 parts by weight of the water-soluble oxetane compound, and the water-soluble oxetane compound and the heteropolyacid compound are fully dissolved in said aqueous medium to be a homogeneous solution;

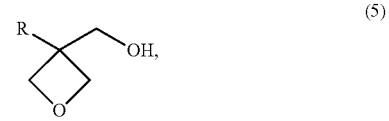

(5)

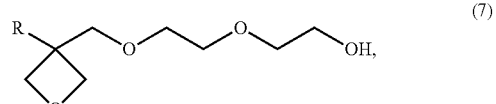

(7)

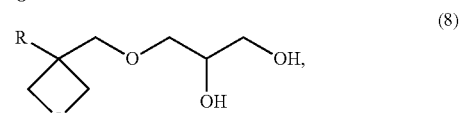

(8)

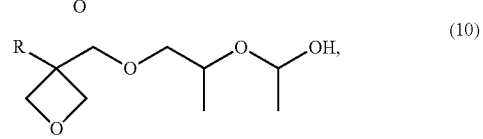

(10)

wherein, R is independently a hydrogen atom or an alkyl group of 1 to 6 carbon atoms; and wherein upon completion of the polymerization of the thermally polymerizable resin composition, the resulting polymer is essentially linear.

2. A thermally polymerizable resin composition as described in claim 1 wherein the heteropolyacid is phosphotungstic acid, phosphomolybdic acid, silicotungstic acid, silicomolybdic acid, or a mixture thereof.

* * * * *